United States Patent Office
3,007,343
Patented Nov. 7, 1961

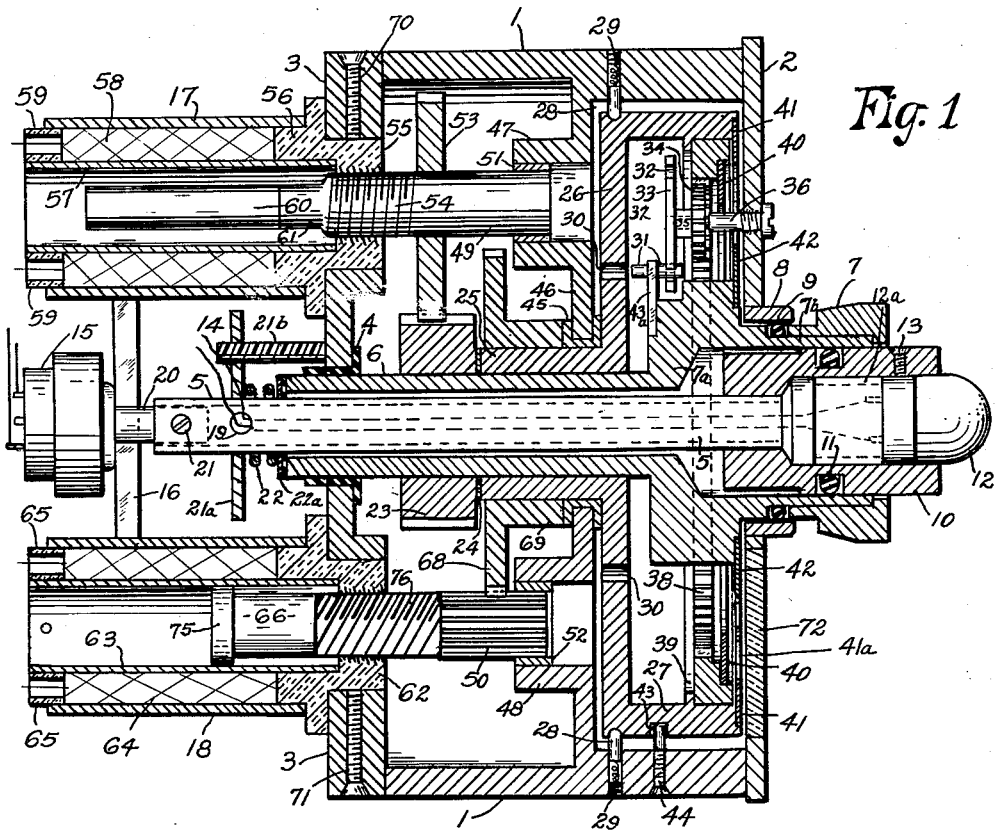
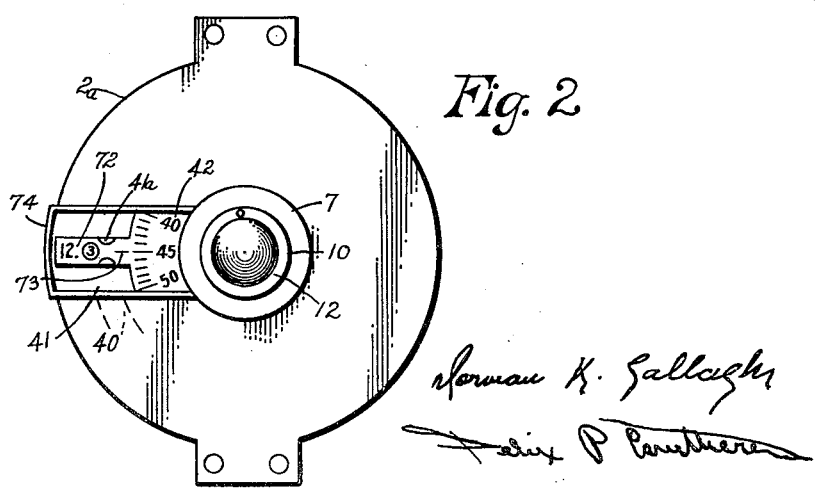

3,007,343
CONTROL DEVICE
Norman K. Gallagher, North Port, and Felix P. Caruthers, Syosset, N.Y., assignors to Specialties, Incorporated, Syosset, N.Y., a corporation of New York
Filed May 20, 1960, Ser. No. 30,662
18 Claims. (Cl. 74—10.5)

This invention relates generally to control devices and particularly to control mechanism for machine tools or the like.

In many applications, including machine tool controls, it is often desired to adjust or vary a compenent by small measured amounts or settings. The component to be varied or adjusted may be a resistor, reactor, capacitor, magnetic element, or otherwise. There has been a need for a device which can be employed for quick and accurate settings of components or other means and we have devised this invention to fill that need.

An object is to provide a control device which can be used generally for varying in predetermined degree a characteristic of a component or member of a machine, device, or system.

Another object is to provide a control device which can be quickly and accurately set to produce a predetermined change of an electrical characteristic of a device.

A further object is to provide a control device which can be accurately set to vary an electrical characteristic of a machine tool control device.

An additional object is to provide a control device which can be set to provide predetermined, accurate changes of reactance of an electromagnetic control component.

A still further object is to provide a control device which can be set to provide predetermined, accurate movement of a core member of an electromagnetic control component.

Other objects will be evident in the specification.

In the drawings:

FIGURE 1 is a part sectional side elevation of our control device.

FIGURE 2 is a front elevation of the device of FIGURE 1, showing scales forming components thereof, and including a front cover plate.

In FIGURE 1 the device shown is especially useful for machine tool controllers. Casing member 1 may be cast in one piece or it may be split along an axial plane and fastened together. Forward plate 2 is screwed to member 1 and rear wall 3 may be screwed to casing member 1. Bearing spool 4 is fastened in a hole in wall 3 and may be made of plastic such as nylon or of any suitable material. Tube 6 is rotatable and slidable in bearing 4. Tube 6 is integral with sleeve **7*b* around which knob 7 is fastened. The sleeve 7*b* is rotatable and slidable in sleeve 8, the space therebetween being sealed by rubber or other resilient ring 9. Sleeve 8 is fastened in a hole in plate 2 and is coaxial with tube 5 which is attached to cylindrical element 10 which in turn is rotatable in sleeve 7*b* and is sealed by resilient ring 11. Electric lamp 12 is fastened in the cylindrical knob 10 as indicated, the screw 13 being tightened against the base portion of the lamp. Conductors 14 are connected to terminals of the lamp and are flexibly connected to a source of current. Potentiometer 15 is mounted on cross bar 16 which is also fastened to cylindrical sleeves 17 and 18. Bar 16 may be supported in any other manner desired and may be attached to a machine or other device. The conductors are brought out of hole 19 in tube 5. Control shaft 20 of the potentiometer is inserted in the adjacent end of tube 5 and is fixed thereto by screw 21**.

Element 6 is rotatable around tube 5 and is also slidable relative thereto against compression spring 22 surrounding the tube and resting against plate **21*a*, normally urging element 6 to the right until gear 23, attached to sleeve 6, strikes washer 24 surrounding sleeve 6 and placed between gear 23 and sleeve 25 which is rotatable around sleeve 6 as a bearing. Sleeve 25 is integral with plate or disc 26 having an integral annular rim 27. This rim is provided with equally spaced depressions around a portion of its circumference, which depressions are arranged to receive spring-urged detents 28 radially movable in holes in casing 1 and contained by threaded plugs 29. Therefore, if sleeve 25 and integral rim 27** are properly indexed through equal spaces the detents will yieldingly hold the rim and sleeve in correct angular position.

Sealing and spacing washers **22*a* are attached to the end of tube 6. One end of spring 22 pushes against washers 22*a*, urging tube 6 to the right. Threaded rod 21*b* is supported in wall 3 and adjustably supports plate 21 which in turn has an opening serving as a bearing for tube 5**.

A number of equally spaced holes 30 are made in disc 26 at uniform radius from the axis of the disc. These holes may correspond in number to the number of depressions in rim 27 associated with detents 28, or otherwise. These holes are adapted to receive pin 31 which is also arranged to enter consecutively the four slots 32 of Geneva movement or wheel 33. This slotted wheel is coaxially attached to gear 34 by means of hub or sleeve 35. The wheel, gear, and hub are rotatable around shaft 36 which has extension 37. This shaft has a threaded head portion which is screwed into a threaded hole in plate 2. The sleeve and gear assembly is fitted over a reduced end portion of shaft 36 so that the shoulder formed acts as a stop for movement of gear 34 to the right. The pin 31 rotates Geneva wheel 33 ninety degrees for each travel of the pin past the wheel.

Gear 34 is meshed with internally threaded ring gear 38 which is rotatable around the inside surface of annular member 27 having a projecting ring 39 acting as a stop for leftward movement of ring gear 38. Thin annular ring 40 is pressed into or otherwise attached to ring gear 38 as shown, being held against a recessed shoulder thereof. This annular member is provided with a scale to be described later. Similar but larger thin annular sheet or member 41 is pressed into a recess formed in the edge of rim 27 and may be attached with screws if desired. The inner radius of member 41 is shorter than the inner radius of member 40 and holes or windows **41*a* are provided in member 41, these holes being equally spaced around this member and at uniform radial distance. Numerals on member 40 can be seen through the windows 41*a* of a member 41. Member 41 can serve as a stop to limit movement of ring gear 38** to the right, or other stop means may be provided.

Annular member 42, similar to members 40 and 41, but of smaller radial dimensions, is fastened to member **7*a* over a shoulder thereof. This member is integral with members 6 and 7. Scales are provided on members 41 and 42 as well as on member 40. Pin 31 is attached to arm 43*a* which is fastened to member 7*a* by screws or otherwise. Arcuate slot 43 is provided in the cylindrical surface of element 27 and threaded pin 44 is screwed into a threaded hole in casing 1. The smooth end portion of pin 44 enters slot 43 and acts as a stop for both directions of rotation of element 27. The slot 43 is made of desired length but two stop pins may be used and may be adjustable in position so that the angular travel of element 27 can be regulated. A separate stop cam plate or slotted plate can be attached to the face of member 26**, if desired.

Spool 45, which may be of brass, bronze, plastic, or any suitable material, surrounds sleeve 25 and serves as a bearing therefor. This spool is fastened in a hole in cross wall 46 and may be made in two pieces if desired. Projecting bearing sleeves 47 and 48 are integral with wall 46 and act as guides for respective shaft 49 and elongated gear 50. Bearing inserts 51 and 52 are provided, preferably. The shaft and gear are both slidable and rotatable in the respective bearings. Gear 53 is fastened to shaft 49 and is meshed with elongated gear or spline 23 relative to which it is slidable. Threads 54 of shaft 49 cooperate with threads in an axially aligned hole in flanged member 55 which may be made of brass, plastic, or other non-magnetic material, preferably. This member is fitted in a hole in plate or wall 3 and is fastened by means of screw 70. Steel tube 17 is fitted over shoulder 56 of member 55 and is attached thereto. Steel tube 57 is fastened in a central recess in member 56, coaxially with tube 17. Electrical winding 58 is wound around tube 57 and the leads to this winding are brought out through short tubes 59 fastened in the end space between tubes 17 and 57. Epoxy or other plastic potting material can be poured into the remaining winding space if desired.

Steel rod 60 of good magnetic permeability is attached to the end portion 61 of shaft 49 by threads, or otherwise. If gear 53 is rotated the threaded shaft 49 will be screwed into or out of threaded member 55 and core member 60 will be moved into or out of winding 58, the direction of movement depending upon the direction of rotation of gear 53. The device may be adjusted by rotating element 56 on threads 54 to position element 60 and then fastening element 55 in place by set screw 70.

Flanged member 62 is similar to member 55 and is similarly mounted in a hole in plate 3, being fastened by screw 71. Outer and inner steel tubes 18 and 63, respectively, are fastened to member 62 in similar manner as tubes 17 and 57 are fastened. Winding 64 is placed in the annular space between tubes 18 and 63 and leads are brought out through tubes 65. As before, epoxy or other potting compound may be poured into the remaining space between tubes 18 and 63. It is preferable that tubes 57 and 63 be relatively thin if made of non magnetic steel. These tubes could be of other low conductivity non magnetic metal. Element 66 may be trimmed or adjusted by rotating it on threads 76 and fastening it by set screw 71.

The transducer assembly including parts 15, 17, 18, 20, 57, 58, 59, 60, 63, 64, 65, 66 and 75 does not constitute a part of this invention but is shown in order to illustrate one specific use for our invention. In essence we have provided a concentric series of knobs or other manually adjustable members which may be manipulated to produce the following functions:

(a) A digitally rotatable shaft; or analog type shaft if the detents are removed. This refers to shaft 50—76.

(b) An analog or vernier shaft 49—54.

(c) A third shaft 5 which may control a third dependent or independent variable.

Core member 66 may be of steel of good magnetic permeability such as silicon steel or some of the nickel steels or the equivalent. This member is screwed or otherwise fastened to threaded shaft 76 which is integral with or attached to spline 50 coaxially therewith. Cylindrical element 75 of plastic, or other non-magnetic material, may be fastened to core member 66 to guide this member through tube 63, maintaining the proper spacing between the core member and the tube. A similar guide member may be used with core member 60. Member 76 is threaded into bearing or guide member 62 and may have coarser or finer threads than threads 54, if desired. Spline 50 is meshed with gear 68 having hub 69 which surrounds sleeve 25 and is fastened thereto. When gear 68 is turned the spline 50 is rotated and member 76 is screwed into or out of member 62, the direction depending upon the direction of rotation of gear 68. The teeth of spline 50 slide through the teeth of gear 68. Accordingly, core member 66 is fed into or out of winding 64 in relatively coarse steps or increments, as compared to the movement of core member 60. It is not essential that the threads of elements 54 and 76 be of different pitch since the same effective results can be obtained by designing core members 60 and 66 to be of different length, diameters, or both. Likewise, these cores could be of different magnetic materials.

Transparent window 72 may be of glass, clear plastic, or the like, and is cemented or otherwise fitted in a hole or window in plate 2. This window is large enough to permit viewing the scales on annular elements 40, 41, and 42. If plate 2 is fastened to another plate or casing member of a machine or other device such as plate 2a in FIGURE 2, a window 72 will be made in the other plate so that the scales on members 41, 42 and 40 can be seen. In FIGURE 2 the window 72 is shown mounted in frame 74. Reference mark 73 is provided on window 72.

While we have described a cylindrical casing, we wish to mention that the casing may be of any desired shape and may comprise merely a framework, without being closed.

In operation, the device is attached to a machine or other support by means of screws or bolts passing through the holes in plate 2a, if used. Otherwise, the plate 2 or any other fixed part of the device may be used for attachment. The leads 14 for the pilot light are connected with a suitable source of current and the feed rate potentiometer 15 is connected into the circuit (not shown) in order to control the rate of feed of the workpiece. Windings 58 and 64 are also connected into the circuit which does not constitute a part of this invention.

As a specific example, we have constructed a control device of the kind described in which the coarse transducer 66 travels 0.480 inch in 48 steps of 0.010 inch each. This is effected by pushing knob 7 to the left until pin 31 enters one of the holes 30 in member 26 and then turning knob 7 until the desired number of steps are indicated by detents 28 engaging the depressions in the rim 27 of member 27. These detents will position the rim accurately and the number of steps taken can be determined both by feel and by hearing the "clicks"; or by scales. If it is desired to displace element 66 by 0.010 inch then knob 7 will be turned until the detents engage the next depression and if 0.480 inch displacement is desired the knob will be turned until 48 steps of the rim are taken. In the example cited the member 26 is indexed 6 degrees for each step. The direction of rotation of knob 7 will of course depend upon the desired direction of movement of core member 66, i.e. whether it is desired to move it into or out of winding 64. When it is moved into the winding the reactance thereof is increased and when it is moved out of that winding the reactance of the winding is effectively decreased. When the knob 7 is released the compressed spring 22 forces sleeve 6 and the attached knob to the right, thereby bringing pin 31 out of the associated hole 30. Gear 23, striking washer 24, acts as a stop. As explained before, the detent plate could be separate and attached to member 26 if desired.

The mechanism for causing movement of core member 66 includes gear 68 attached to sleeve 25 and driven spline 50 which rotates threaded member 76 attached to member 66. This causes member 66 to be shifted laterally, the teeth of spline 50 sliding through the teeth of gear 68.

The fine transducer 60 has a total travel 0.500 inch and may be adjusted in infinitely small steps by turning knob 7 without pushing it to the left. When this is done the gear or spline 23 drives larger gear 53 which slowly rotates the threads 54 of element 49, with the result that threads 54 are fed slowly through member 55 and core member 60 is moved slowly along the axis of winding 58. The fine transducer may be used to vary the reactance of the circuit between settings of the coarse transducer. Each revolution of knob 7, when in its fine or out position, changes the reading of the scale on dial 42 by 0.100 inch with reference to mark or line 73. When this dial is rotated to the third scale division on either side of the "00" mark the Geneva drive pin 31 enters one of the four slots 32 and indexes the Geneva wheel 33 by 90 degrees thereby causing gear 34 to rotate gear 38 and attached dial 40 through 12 degrees. This causes that dial to show the next larger or next smaller number through windows 41a of scale member 41.

As a summation, the fine transducer is regulated by turning knob 7 and its scale member 42 indicates the degree of rotation or its relative position. The coarse transducer is regulated by pressing knob 7 to the left (FIG. 1) and turning it, and the scale on member 41 indicates the relative position of the coarse transducer. As described above, the indexing of Geneva wheel 33 and attached gear 34 through 90 degrees by pin 31 causes internal gear 38 to shift 12 degrees, thereby causing intermediate scale member 40 to present the next higher or lower number, depending upon the direction of rotation. The indications of the three scales will therefore show the relative positions of transducers 60 and 66, and in effect will indicate the reactance of the assembly.

The potentiometer control shaft 20 is rotated by turning knob 10 which is rotatable within sleeve 7. This rotates attached tube 5 which rotates shaft 20. The lamp 12 may be connected to a steady source of current or it may be connected in circuit with the potentiometer so that the setting of the potentiometer will be indicated approximately by the intensity of the illumination produced by lamp 12. An on-off switch may be used, however.

This control device has been built primarily for use with a machine tool controller but is not at all limited to that use. It may be employed for fine or coarse setting of mechanical systems as well as for electrical systems. The specific figures or dimensions given above are for the purpose of illustration only and the device is not limited to the quoted values or dimensions.

This transducer is readily applicable for the control of hydraulic valves, splash proof magnetic cores, and mechanisms of wide variety. Various mechanical arms, levers, or the like may be attached to members 60 and 66 or may be moved by them. Covers 17, 18, 57 and 63 may be removed.

A principal advantage of this control is that it provides a very rapid adjustment or setting as compared to prior devices and with appropriate system circuitry it will provide for stepless or contactless switching.

What we claim is:

1. In a control device, transducer means including a first movable member, first means supporting said member for relative movement lengthwise thereof, first gear means connected with said member for producing said movement in relatively coarse steps, means operatively connected with said first gear means for indexing said steps, said transducer means including another movable member, second means supporting said other movable member for relative lengthwise movement thereof, second gear means operatively connected with said other member for producing said movement of said other movable member in relatively fine degree, first scale means rotatably connected with said first gear means for indicating movement of said first movable member in relatively coarse steps, second scale means rotatably connected with said second gear means for indicating movement of said other member in relatively fine degree, third scale means intermittently rotatably connected with said first gear means for indicating movement of said other member in degree intermediate the degrees of said relatively coarse and relatively fine movements, and means including a linearly and rotatably movable manually grasped element for moving said gear means, said second gear means being normally operably connected with said grasped element and said first gear means being operably connected with said grasped element upon direct application of manual force thereto to cause displacement thereof along the axis of said grasped element.

2. The device as described in claim 1, and means including a Geneva movement for moving said third scale means.

3. The device as described in claim 1, and including an electric lamp attached to said element coaxially therewith.

4. The device as described in claim 1, said first scale means substantially covering said third scale means and having a plurality of openings for making visible the numerals of said third scale means.

5. In a control device, frame means, a manually rotatable member which is also directly manually movable along the axis thereof and having rotary bearing in said frame means, said rotatable member having a tubular portion and a large annular portion projecting beyond said frame means, a generally cylindrical member having rotatable bearing in said annular portion and projecting from said annular portion, a tube fastened to said cylindrical member and being rotatable in said tubular portion, a first threaded shaft and surrounding threaded means meshed therewith and attached to said frame means, a second threaded shaft and surrounding second threaded means meshed therewith and attached to said frame means, bearing means fixed to said frame means and supporting portions of said shafts for axial and rotary movement, gear means connecting said tubular portion and said first threaded shaft to cause rotation and axial movement thereof, said second threaded shaft having a spline portion, rotatable drive means including other gear means meshed with said spline for rotating said second threaded shaft, and clutch means made effective by axial movement of said annular portion operatively connecting said rotatable member and said drive means for rotating said other gear means when said annular portion is displaced along its axis and is rotated.

6. The device as described in claim 5, and including an electric lamp fastened in said annular portion, and conductors passing through said tube and connected with said lamp.

7. The device as described in claim 5, said other gear means including a rotary member attached thereto and adapted to be driven by said cylindrical member when said clutch means is effective.

8. The device as described in claim 5, said other gear means including a rotary member attached thereto and comprising a part of said clutch means, a scale carried by said rotary member, and a scale carried by said cylindrical member.

9. The device as described in claim 5, and including a first rotary member comprising a part of said clutch means, a second rotary member having rotary bearing in said first rotary member, means driven intermittently by said cylindrical member for producing intermittent limited rotation of said second rotary member relative to said first rotary member, and scale means carried by said cylindrical member and said first and second rotary members.

10. The device as described in claim 9, and including detent means for indexing predetermined displacements of said first rotary member.

11. The device as described in claim 1, said scale means indicating digits from 00.00 to 29.99 and to a third decimal place by means of markings of said scale means, for rotation of said manually movable element of not more than five turns thereof, readings of a fourth decimal place being obtainable by interpolation.

12. In a control device, frame means, a first rotatable member having bearing in said frame means, a first annular scale member attached to said rotatable member, detent means mounted in said frame means and adapted to engage recesses in said rotatable member, a rotatable gear element supported by said rotatable member and rotatable relative thereto, a second annular scale member attached to said element and adapted to show scale indicia through openings in said first scale member, a manually operated member having rotary and axially movable bearing in said frame means and having a generally cylindrical portion and a tubular portion of smaller diameter integral therewith, said cylindrical portion partially projecting beyond said frame means, a spring pressing against said manually operated member and a fixed part of said device and adapted yieldingly to hold said manually operated member in position projecting beyond the frame means, means carried by said manually operated member for engaging said first rotatable member when said manually operated member is pushed in axial direction to compress said spring, means including a Geneva wheel and gearing meshed with said gear element for rotating said rotatable element through steps when actuated by said carried means when said generally cylindrical member is manually rotated, a third annular scale member carried by said manually operated member which is substantially coaxial with said annular scale members, a gear attached to said first rotatable member coaxially therewith, a shaft linearly and rotatably movable in bearings in said frame means, one of said bearings comprising a threaded sleeve surrounding and meshed with a threaded portion of said shaft, the remaining portion of said shaft comprising a spline meshed with said gear, a second shaft having a threaded portion rotatable and linearly movable in a meshed threaded bearing of said frame means and having a smooth portion rotatably and linearly movable in another bearing of said frame means, a second gear attached to said second shaft coaxially therewith, and a gear surrounding said tubular portion and attached thereto and meshed with said second gear.

13. The control device as described in claim 12, and including a second manually operated member rotatable in said cylindrical portion, and a tube attached to said second manually operated member and placed within said tubular portion.

14. The control device as described in claim 12, and including means for adjusting the degree of compression of said spring.

15. The control device as described in claim 19, and including means for limiting the rotary movement of said first rotatable member.

16. The control device as described in claim 12, said rotatable element comprising a ring having internal gear teeth, and said gear teeth being meshed with said gearing.

17. In a control device, a first shaft having a threaded portion and a smooth portion, a surrounding element attached to said device and threaded to rotatably receive said threaded portion with which said element is meshed, a bearing fixed to said device and supporting said smooth portion for axial and rotary movement, a first gear attached to said first shaft, a second shaft having a threaded portion and a spline portion, a threaded element attached to said device and surrounding the threaded portion of said second shaft and meshed therewith, a bearing fixed to said device and supporting said spline portion for rotary and axial movement, a rotatable manually operated member, means attached to said device for supporting said manually operated member for rotation, gear means connecting said manually operated member and said first gear, a second manually operated member, means supporting said second manually operated member for rotation, gear means connecting said second manually operated member and said spline, said gear means providing a rate of movement of the first shaft different from the rate of movement of the second shaft for the same rate of rotation of said manually operated members, scale means attached to said manually operated members for indicating the degree of rotation thereof, and means including a manually grasped member rotatably and linearly movable along the axis thereof and operatively connected with one or both of said manually operated members according to the position of said manually grasped member along its axis.

18. The device as described in claim 17, and including means supporting said threaded elements for manual rotation, and means for fastening said threaded elements in the supporting means therefor.

References Cited in the file of this patent

UNITED STATES PATENTS

| | | |
|---|---|---|
| 2,346,030 | Johnson | Apr. 4, 1944 |
| 2,756,599 | Sperber | July 31, 1956 |
| 2,775,896 | Silvey et al. | Jan. 1, 1957 |
| 2,824,957 | Meadows et al. | Feb. 25, 1958 |
| 2,834,216 | Thompson | May 13, 1958 |
| 2,914,952 | Frischmann | Dec. 1, 1959 |
| 2,914,953 | Tyzack | Dec. 1, 1959 |